Feb. 7, 1967     E. W. TURPIN     3,302,275
TIRE TOOL
Filed Oct. 12, 1964
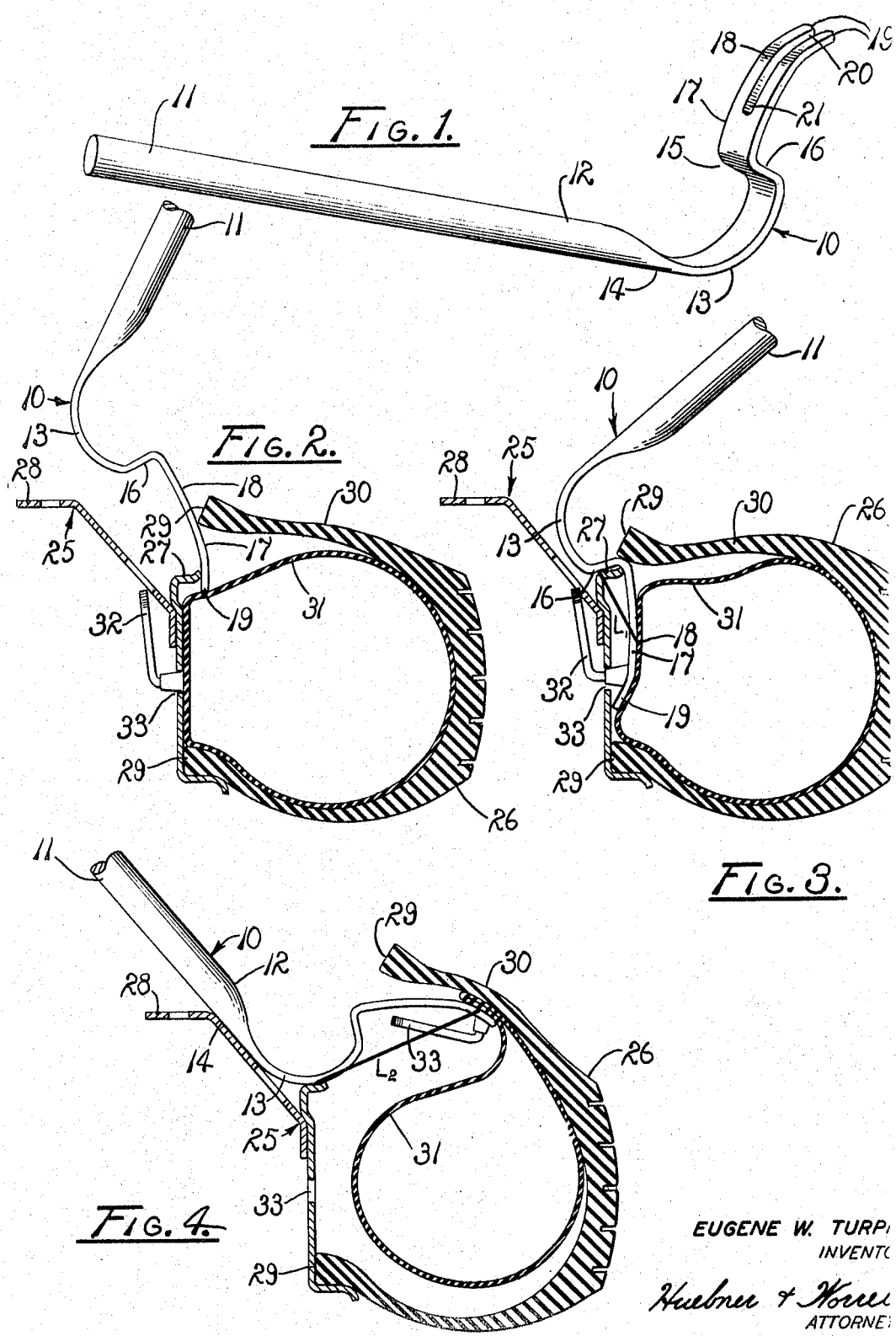
EUGENE W. TURPIN
INVENTOR
Huebner & Worrel
ATTORNEYS

United States Patent Office 3,302,275
Patented Feb. 7, 1967

3,302,275
TIRE TOOL
Eugene W. Turpin, 66 N. Academy,
Sanger, Calif. 93657
Filed Oct. 12, 1964, Ser. No. 403,137
6 Claims. (Cl. 29—221.5)

The present invention relates to a tire tool particularly adapted for removing the valve stem of pneumatic tire tubes from the receiving aperture of the mounting rim.

Although certain pneumatic tires for automotive vehicles now employ tubeless tires, many of the vehicles intended for heavy-duty service utilize tubes mounted within the tire in the conventional manner practiced prior to the introduction of the tubeless tires. In dismounting such tube-type tires from their respective supporting rims, difficulty is frequently encountered in withdrawing the valve stem from the aperture, or receiving throat, provided in the rim at a point intermediate the mounting flanges thereof.

This is particularly true in the case of truck tires which necessarily are of a ply rating greater than passenger car tires. This results in heavy side walls, which are quite stiff and somewhat inflexible as compared to tires used on passenger automobiles and other light-duty vehicles. In addition, the bead portion of such truck tires is of a greater axial dimension, which in conjunction with the side wall stiffness, precludes easy insertion of a workman's hand to withdraw the valve stem from the aperture in the mounting rim. For reasons of safety, such manual stem removal is neither recommended nor practiced to great extent.

Previously available tire irons intended for the removal of the beads from the rim have not been found to be entirely satisfactory for use in withdrawing the valve stem prior to dismounting of the tire. The normal practice is to first remove one of the tire beads from its retaining flange and then attempt to pry the tube radially from the rim so as to withdraw the stem. Alternatively, it is sometimes attempted to push the valve stem from its distal end in an attempt to withdraw it from the receiving aperture. This is accomplished with a certain degree of difficulty since the major portion of truck tubes are provided with offset, or bent, valve stems to facilitate servicing of the tires when mounted on their rims, particularly in rims intended for use on dual wheels. Consequently, previously available tire tools and employed methods have been found to be time consuming, somewhat hazardous to workmen, as well as presenting a possibility of damage to the tube area at the base of the valve stem.

Accordingly, it is an object of the present invention to provide a tire tool particularly well suited for withdrawing the valve stem of a pneumatic tire tube from the aperture of the mounting rim.

Another object is to provide a tool for use in removing the valve stem of a heavy truck tire from the rim on which the tire is mounted.

Another object is to provide such a tool having a configuration affording a varying lever arm during use in withdrawing a valve stem and concurrently axially displaces the tire from the rim to facilitate manual grasping of the stem.

A further object is to provide a tire tool particularly adapted to promote safety and efficiency in removing tube-type pneumatic tires from their respective mounting means.

These, together with other objects, will become more fully apparent upon reference to the following description and accompanying drawing.

In the drawing:

FIG. 1 is a perspective view of a tire tool embodying the principles of the present invention.

FIG. 2 is a fragmentary view in side elevation of the tool of FIG. 1 shown in a position of initial insertion between a tire and its mounting rim, illustrated fragmentarily in radial section.

FIG. 3 is a view similar to FIG. 2, but showing the tool inserted to engage the tube at the area adjacent to the valve stem.

FIG. 4 is a view also similar to FIG. 2, but showing the tool in a position withdrawing the valve stem from the aperture in mounting rim.

Referring more particularly to the drawings, a tool is shown at 10 as a specific embodiment of the invention. The tire tool provides an elongated handle 11 defining a longitudinal axis for the tool and affording a rounded grasping area for a workman. A shank 12 is integrally extended from the handle and includes a curved portion 13 as a fulcrum area. The curved fulcrum area is extended longitudinally of the tool and provides an arcuately outwardly curved surface at a predetermined radius of curvature, the purpose of which will be subsequently apparent. The shank portion includes a flat abutment area 14 intermediate the grasping handle and the fulcrum area 13. An offset portion 15 is carried by the shank and provides a stop shoulder 16 adapted to engage a flange of the mounting rim. A bifurcated entry portion 17 is rigidly secured to the offset portion 15 and provides a curved surface 18 at a radius of curvature greater than the predetermined radius of the fulcrum area. The engaging surface 18 is reversely curved and offset from the curved fulcrum area 13. A pair of entry points 19 define an admission throat 20 dimensioned to receive the valve stem of a conventional pneumatic tube and terminates in an abutment wall 21, thereby to limit the throat.

Operation

The operation of the described embodiment of the subject invention is believed to be readily apparent and is briefly summarized at this point. As illustrated in FIGS. 2, 3 and 4, a conventional mounting rim 25 supports a pneumatic tube-type tire 26. The rim includes a pair of axially spaced retaining flanges, one of which is shown at 27 as being integrally joined to the web 28 of the rim. Certain types of rims employ a removable locking flange, not shown, which facilitates removal of the tire. Since the present invention is primarily intended for use in removal of the valve stem, the type of mounting rim is of no particular consequence.

In the position shown in FIG. 2, a tire bead 29 has been removed from the retaining flange 27 and rests thereupon when the tire is disposed in a substantially horizontal position on a supporting surface. The tire illustrated is intended for use in heavy-duty service, such as encountered on large trucks and the like. Accordingly, a side wall 30 of a high ply rating and limited flexibility is provided in the tire 26. The tire is of the tube-type and includes a tube 31 shown in a position internally of the tire in circumscribing relation to the rim. A valve stem 32 is radially inwardly extended from the tube and projects through an aperture 33 provided in the rim for reception of the valve stem. In certain forms of mounting rims for such heavy-duty truck tires, the aperture 33 may be extended axially of the rim in the form of an elongated hole or admission throat. In either form of stem receiving aperture, the tire tool 10 is equally well-suited for withdrawal of the valve stem.

The initial step in such withdrawal is to insert the entry points 19 between the retaining flange 27 and the tire bead 29, as illustrated in FIG. 2. The extent of penetration is limited by the offset stop shoulder 16 which engages the flange, as well as the length of the throat 20 determined by the inner limit 21, depending upon the relative dimensions of the tire rim and the throat 20.

Upon maximum penetration of the entry portion 17 of the tool, the fulcrum area 13 engages the rim flange at a point adjacent the shoulder 16, as illustrated in FIG. 3. In this position, the lever arm of the tool as measured from the point of the fulcrum area in contact with the rim flange to the engaging surface immediately adjacent the inner limit 21 of the throat 20 and in contact with the tube is of a minimum dimension as compared to the effective lever arm during further progressive stages of tool positions during rocking about the fulcrum area. The effective length of the lever arm is designated in FIG. 3 as $L_1$. It will be observed that the effective length of the lever arm for the force applied by the workman is considerably greater in length than the lever arm designated as $L_1$ acting upon the tube. Accordingly, maximum break-out force is available to the workman during initial withdrawal of the valve stem from the receiving aperture 33.

The valve stem is easily withdrawn from the receiving aperture by rocking movement of the tool about the fulcrum area 13 in contact with the rim flange 27 and web 28, so that successive fulcrum points are utilized which are moved progressively toward the handle 11. Consequently, the effective length of the lever arm acting on the tube is progressively increased, with proportionate shortening of the effective length of the force applied by the workman. The effective length of the lever arm acting on the tube at the last portion of rocking movement is designated in FIG. 4 as $L_2$, and is measured from that point of the fulcrum area 13 in contact with the rim flange to the point of the curved engaging surface 18 immediately adjacent to the entry points 19 which is then in contact with the tube.

Concurrently, the curved engaging surface 18 also raises the tire bead 29 and displaces it axially from the retaining flange 27 to permit the workman to grasp the valve stem and aid in its positioning and prevent re-entry of the valve stem in the aperture upon release and withdrawal of the tool. The flat abutment area 14 is then in contact with the rim web and prevents further rocking of the tool, so that a stable position is maintained during this positioning of the valve stem. This stability is highly desirable, since the weight and rigidity of the wide wall will easily and severely injure the workman's hand and fingers in the event of tool slippage or shifting of the tire position.

Accordingly, the present invention provides a tire tool which readily withdraws the valve stem from its receiving aperture and affords an efficiency in tire dismounting. In addition, the invention insures the safety of the workman and precludes injury during removal of heavy truck tires from their mounting rims.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A tire tool for withdrawing a valve stem of a pneumatic tire tube from a aperture in its mounting rim comprising an elongated handle; a shank portion integrally joined to the handle and providing an outwardly curved surface extended longitudinally of the tool as a fulcrum area; a bifurcated entry portion extended from the shank in offset relation to the fulcrum area and providing an engaging surface to straddle the valve stem and urge the tube outwardly from the rim to withdraw the valve stem; and stop means carried by the shank to engage the rim and to limit penetration of the entry portion.

2. A tire tool as an aid in dismounting a pneumatic tube-type tire from a supporting rim having an aperture through which the valve stem protrudes from a tube circumscribing the rim between axially spaced flanges, one of which is secured to a web of the rim, the tool comprising an elongated handle affording a longitudinal axis; a shank portion integrally joined to the handle and providing an arcuately outwardly curved surface extended longitudinally of the tool as a fulcrum area adapted for rocking contact with the rim, said shank portion including a substantially flat surface between it and the handle which is disposable against said web of the rim in intimate facing engagement to limit said rocking movement of the tool; and a bifurcated entry portion extended from the shank in offset relation to the fulcrum area and providing a curved tube engaging surface to straddle the valve stem and withdraw it from the aperture, the lever arm measured between the portion of the fulcrum area in contact with the rim and the portion of the engaging surface in contact with the tube increasing in length as the tool is rocked about successive fulcrum points longitudinally of the fulcrum area during use.

3. A tire tool for withdrawing the valve stem of a tire tube from an aperture in its mounting rim comprising an elongated handle affording a manual grasping area; a shank portion integrally joined to the handle and providing an outwardly curved surface extended longitudinally of the tool as a fulcrum area; and a bifurcated entry portion extended from the shank in offset relation to the fulcrum area and providing an engaging surface defining an entry throat to receive the valve stem, the engaging surface being reversely curved relative to the fulcrum area at a radius of curvature greater than that of the fulcrum area.

4. A tire tool for withdrawing a valve stem of a tire tube from an aperture in its mounting rim wherein the tire has axially spaced beads, one of which is removed in axial spaced relation from a mounting flange secured to the web of a rim, the tool comprising an elongated handle affording a longitudinal axis and a manual grasping area; a shank portion integrally joined to the handle and providing an outwardly curved surface at a predetermined radius of curvature and extended longitudinally of the tool as a fulcrum area, the shank also having a flattened area intermediate the handle and the fulcrum area to contact the web and and limit rocking movement of the lever during use; an offset shoulder carried by the shank to engage the rim and limit penetration of the tool between the tire bead and the flange; and a bifurcated entry portion extended from said shoulder in offset relation to the fulcrum area and providing an engaging surface to straddle the valve stem and urge the tube outwardly from the rim, said engaging surface being reversely curved relative to the fulcrum area at a radius of curvature greater than that of the fulcrum area so that the effective lever arm measured between the fulcrum area and the engaging surface of the entry portion in contact respectively with the rim and the tube increases during rocking movement of the tool about the fulcrum area until reaching a maximum length upon contact of the rim web by the flattened area of the shank.

5. A tire tool for withdrawing a valve stem of a pneumatic tire tube from an aperture in its mounting rim comprising an elongated handle; a shank portion integrally longitudinally extended from the handle and providing an outwardly curved surface defining a fulcrum area engageable with the rim; and a bifurcated entry portion extended from the shank to receive the valve stem and providing an engaging surface reversely curved relative to the fulcrum area.

6. The tire tool of claim 5 in which said bifurcated entry portion provides a pair of spaced entry points slidably engageable with the rim between the rim and the tube with the curvature of the entry portion providing an initial stem breakout force against the tube prior to engagement of said fulcrum area with the rim.

References Cited by the Examiner
UNITED STATES PATENTS

| | | | |
|---|---|---|---|
| 1,892,824 | 1/1933 | Ziegler et al. | 29—267 X |
| 2,492,482 | 12/1949 | Kendall | 29—221.5 |

WILLIAM FELDMAN, *Primary Examiner.*

J. C. PETERS, *Assistant Examiner.*